United States Patent
Scheibelhut et al.

(10) Patent No.: US 12,417,465 B1
(45) Date of Patent: Sep. 16, 2025

(54) USING A TRAINED MODEL TO PREDICT A USER'S PRICE SENSITIVITY BASED ON DATA ACQUIRED FROM IN-STORE SENSORS

(71) Applicant: Maplebear Inc., San Francisco, CA (US)

(72) Inventors: Brent Scheibelhut, Toronto (CA); Charles Wesley, San Diego, CA (US); Naval Shah, Toronto (CA); Madeline Mesard, New York, NY (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/603,589

(22) Filed: Mar. 13, 2024

(51) Int. Cl.
*G06Q 30/0201* (2023.01)
*G06Q 30/02* (2023.01)
*G06Q 30/0601* (2023.01)

(52) U.S. Cl.
CPC ..... *G06Q 30/0206* (2013.01); *G06Q 30/0281* (2013.01); *G06Q 30/0603* (2013.01)

(58) Field of Classification Search
CPC ........... G06Q 30/0206; G06Q 30/0281; G06Q 30/0603
See application file for complete search history.

(56) References Cited

U.S. PATENT DOCUMENTS

| | | | | |
|---|---|---|---|---|
| 12,045,846 | B1 * | 7/2024 | Tilly | G06Q 30/0206 |
| 2002/0116348 | A1 * | 8/2002 | Phillips | G06Q 30/06 |
| | | | | 705/400 |
| 2005/0149392 | A1 * | 7/2005 | Gold | G06Q 30/0254 |
| | | | | 705/14.5 |
| 2007/0282667 | A1 * | 12/2007 | Cereghini | G06Q 30/0206 |
| | | | | 705/7.35 |
| 2010/0023340 | A1 * | 1/2010 | Chowdhary | G06Q 30/02 |
| | | | | 705/1.1 |
| 2011/0119071 | A1 * | 5/2011 | Phillips | G06Q 30/02 |
| | | | | 705/1.1 |
| 2011/0184779 | A1 * | 7/2011 | Mittal | G06Q 30/02 |
| | | | | 705/7.31 |

(Continued)

OTHER PUBLICATIONS

Shopic "5 Smart Cart Functions that Consumers Would Love" Aug. 3, 2022 (available at: https://www.shopic.co/knownledge/5-smart-cart-functions-that-consumers-would-love%EF%BF%BC/) (Year: 2022).*

*Primary Examiner* — Rupangini Singh
*Assistant Examiner* — Stephanie S. Wallick
(74) *Attorney, Agent, or Firm* — Fenwick & West LLP

(57) ABSTRACT

A trained model is used to determine a price sensitivity feature for a user of an online system. The online system generates input data by gathering replacement data via a user interface at a device associated with the user and/or in-store behavior data related to replacement of items performed by the user at a location of a retailer when using a physical receptacle in communication with the online system. The online system applies a price sensitivity model to predict, based on the input data, a price sensitivity score for the user indicative of the price sensitivity feature of the user. The online system identifies, based on the price sensitivity score, one or more actions related to prompting the user to convert one or more items. The online system applies the one or more actions to prompt the user to convert the one or more items.

15 Claims, 6 Drawing Sheets

(56) References Cited

U.S. PATENT DOCUMENTS

| | | | |
|---|---|---|---|
| 2013/0325556 A1* | 12/2013 | Kimmerling | G06Q 30/0206 705/7.35 |
| 2015/0100384 A1* | 4/2015 | Ettl | G06Q 30/0206 705/7.35 |
| 2019/0272557 A1* | 9/2019 | Smith | G06Q 10/087 |
| 2021/0027360 A1* | 1/2021 | Shmueli | G06F 1/163 |
| 2021/0042816 A1* | 2/2021 | Chomley | G06Q 30/04 |
| 2021/0056580 A1* | 2/2021 | Walker | G06Q 30/0222 |
| 2022/0222732 A1* | 7/2022 | Shuparsky | G06Q 30/0631 |
| 2024/0257210 A1* | 8/2024 | Cai | G06Q 30/0631 |
| 2024/0331011 A1* | 10/2024 | Clarke | G06Q 30/0629 |

* cited by examiner

USING A TRAINED MODEL TO PREDICT A USER'S PRICE SENSITIVITY BASED ON DATA ACQUIRED FROM IN-STORE SENSORS

BACKGROUND

Users of an online system, such as an online concierge system, have different levels of "price sensitivity." In general, a user is considered to be "price insensitive" if the user would purchase an item they want irrespective of a price of the item. And a user is considered to be "price sensitive" if the user would not pay an even higher price to purchase an item they want. Instead of purchasing an expensive item, the "price sensitive" user would choose a cheaper substitute item. The price sensitivity may also vary based on user confidence in a specific item type, in a retailer at which the user places an online order, etc. However, it is not possible to determine, for each particular user, a precise metric for the user's price sensitivity using conventional means, such as manually observing a user's action. Hence, there is a technical problem of how to determine, at a large enough scale as required by an online system, a price sensitivity for each user of the online system, including how to acquire information about users' behavior that is useful to determine a user's price sensitivity.

SUMMARY

Embodiments of the present disclosure are directed to using a trained model of an online system (e.g., online concierge system) to predict a user's price sensitivity based at least in part on data acquired from in-store sensors. In accordance with one or more aspects of the disclosure, the online system gathers at least one of replacement data related to a replacement of a first set of one or more items via a user interface at a device associated with a user of an online system to generate input data or in-store behavior data related to a replacement of a second set of one or more items performed by the user at a location of a retailer associated with the online system when using a physical receptacle in communication with the online system to generate the input data. The online system accesses a price sensitivity model of the online system, wherein the price sensitivity model is trained to predict a price sensitivity feature of the user. The online system applies the price sensitivity model to predict, based on the input data, a price sensitivity score for the user that is indicative of the price sensitivity feature of the user. The online system identifies, based at least in part on the price sensitivity score, one or more actions related to prompting the user to convert one or more items. The online system applies the one or more actions at the online system to prompt the user to convert the one or more items.

DETAILED DESCRIPTION

Figure 1:
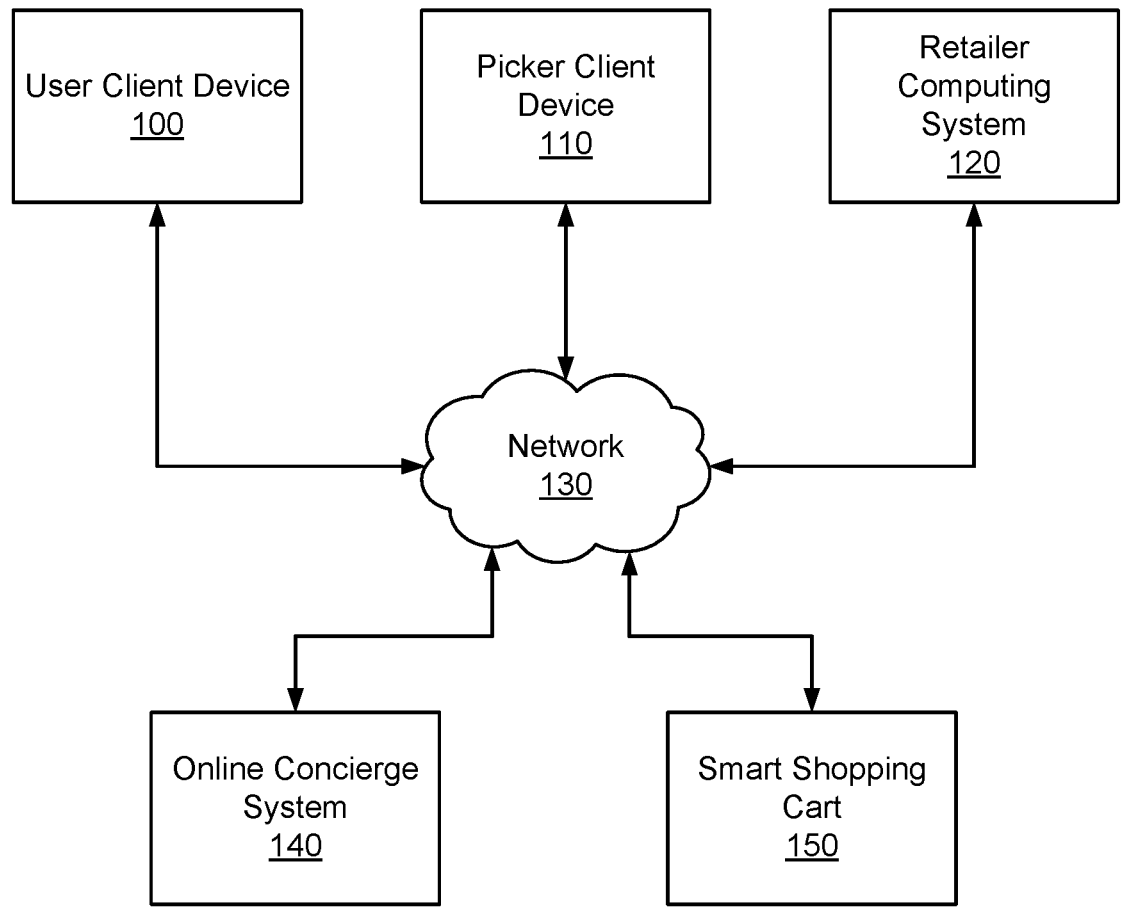
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a user client device 100, a picker client device 110, a retailer computing system 120, a network 130, an online concierge system 140, and a smart shopping cart 150. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and retailer computing system 120 are illustrated in FIG. 1, any number of users, pickers, and retailers may interact with the online concierge system 140. As such, there may be more than one user client device 100, picker client device 110, or retailer computing system 120.

The user client device 100 is a client device through which a user may interact with the picker client device 110, the retailer computing system 120, or the online concierge system 140. The user client device 100 can be a personal or mobile computing device, such as a smartphone, a tablet, a laptop computer, or desktop computer. In some embodiments, the user client device 100 executes a client application that uses an application programming interface (API) to communicate with the online concierge system 140.

A user uses the user client device 100 to place an order with the online concierge system 140. An order specifies a set of items to be delivered to the user. An "item," as used herein, means a good or product that can be provided to the user through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The user client device 100 presents an ordering interface to the user. The ordering interface is a user interface that the user can use to place an order with the online concierge system 140. The ordering interface may be part of a client application operating on the user client device 100. The ordering interface allows the user to search for items that are available through the online concierge system 140 and the user can select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the item should be collected.

The user client device 100 may receive additional content from the online concierge system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online concierge system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same retailer location. The collection interface further presents instructions that the user may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the user client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a user's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the user client device 100 for display to the user, so that the user can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a user from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The user client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which users can order items to be provided to them by a picker from a retailer. The online concierge system 140 receives orders from the user client device 100 through the network 130. The online concierge system 140 selects a picker to service the user's order and transmits the order to the picker client device 110 associated with the picker. The picker collects the ordered items from a retailer location and delivers the ordered items to the user. The online concierge system 140 may charge a user for the order and provide portions of the payment from the user to the picker and the retailer.

As an example, the online concierge system 140 may allow a user to order groceries from a grocery store retailer. The user's order may specify which groceries they want delivered from the grocery store and the quantities of each of the groceries. The user client device 100 transmits the user's order to the online concierge system 140 and the online concierge system 140 selects a picker to travel to the grocery store retailer location to collect the groceries ordered by the user. Once the picker has collected the groceries ordered by the user, the picker delivers the groceries to a location transmitted to the picker client device 110 by the online concierge system 140.

The online concierge system 140 may train a model (e.g., machine-learning model) to predict a user's price sensitivity to different types of items. The model may predict a user's price sensitivity based on the user's previous interaction with items, which may be captured by a specialized equipment, such as the user client device 100 and/or the smart shopping cart 150. The online concierge system 140 may apply various heuristics to classify a user as being price sensitive or not, and then use the price sensitivity labels about a collection of users to train the model. The online concierge system 140 may use the trained model to make decisions about recommendations for other users, such as suggestions to consider buying other items or dynamically setting coupons or other promotions. The trained model may determine a price sensitivity of a user based on their purchasing patterns, specifically relying on the replacements they opt for, as well as in-store user behavior, especially when placing items in and out of the smart shopping cart 150 and at checkout, and usage of the in-store list functionality of an online application running on the user client device 100. The trained model thus determines the price sensitivity of the user based on their omni channel presence on the user client device 100 and/or the smart shopping cart 150, which can be then fed back into the online concierge system 140 and provided to retailers as insights on a product-defined level. The online concierge system 140 may utilize information about price sensitivity of their users to offer retailers operational insights based on metrics such as item popularity, order sizes, and gross merchandise value (GMV). The online concierge system 140 is described in further detail below with regards to FIG. 2.

The smart shopping cart 150 is an in-store shopping cart that enables a user of the online concierge system 140 to physically add (i.e., place) items from a location of a retailer (e.g., store) into the smart shopping cart 150 and check the items out from the location of the retailer without an involvement of an employee of the retailer at the point of sale. The smart shopping cart 150 may be connected to the online concierge system 140 via the network 130. During the user's shopping session, the smart shopping cart 150 may utilize various sensors (e.g., one or more weight sensors, one or more cameras, etc.) to gather data about the user's activity, including, but not limited to, a location of the smart shopping cart 150 in the store, weight changes of the smart shopping cart 150 as items are added to or removed from the smart shopping cart 150, video of the user's activity in and around the smart shopping cart 150, etc. Data gathered by various sensors of the smart shopping cart 150 may be utilized by the trained model of the online concierge system 140 to predict a price sensitivity score for a specific user. In one or more embodiments, the smart shopping cart 150 is considered being a part of the online concierge system 140. It should be noted that the concepts described herein in relation to the smart shopping cart 150 can be extended and/or applied to other form factors, such as a handheld shopping basket, a handheld receptacle, or some other handheld object that can be used to receive and store shopping items. The smart shopping cart 150 is described in further detail below with regards to FIG. 3.

Figure 2:
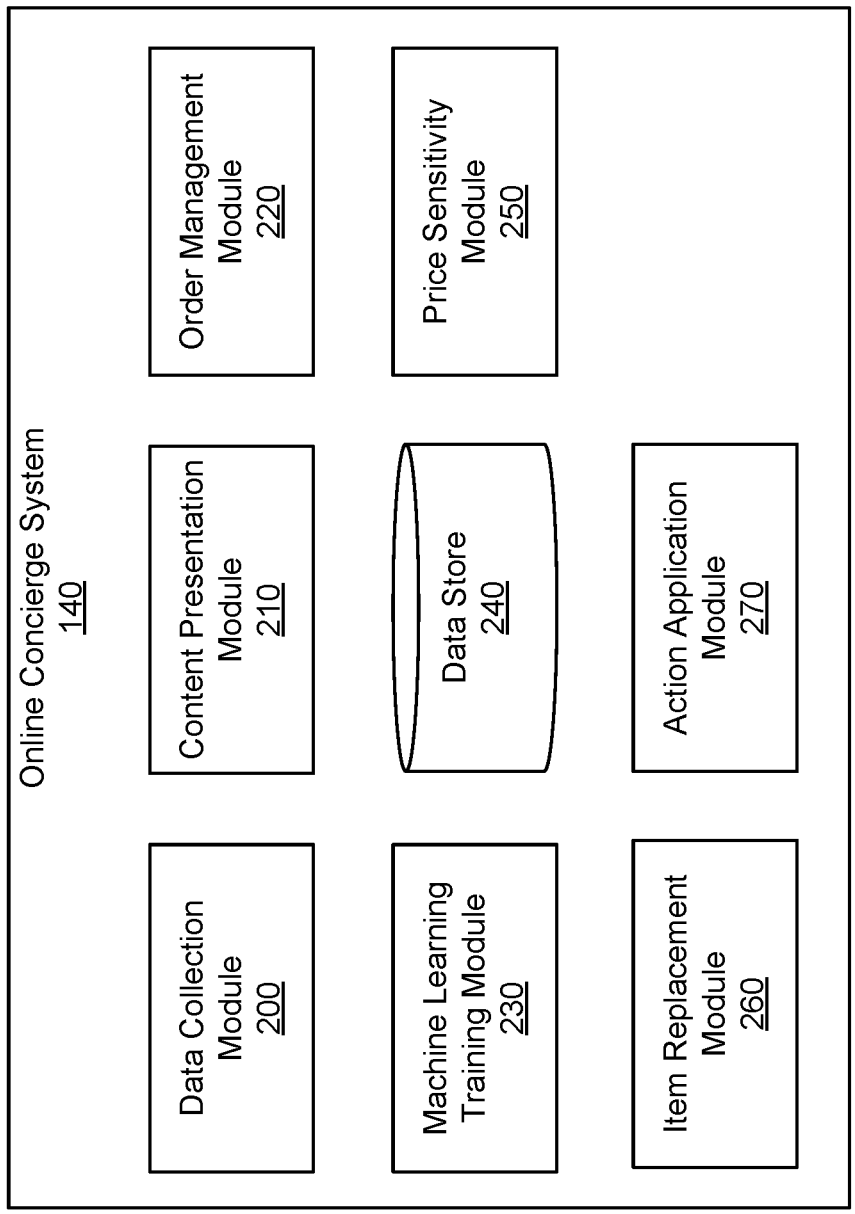
FIG. 2 illustrates an example system architecture for an online concierge system, in accordance with one or more embodiments.

FIG. 2 illustrates an example system architecture for the online concierge system 140, in accordance with some embodiments. The system architecture illustrated in FIG. 2 includes a data collection module 200, a content presentation module 210, an order management module 220, a machine-learning training module 230, a data store 240, a price sensitivity module 250, an item replacement module 260, and an action application module 270. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects user data, which is information or data that describe characteristics of a user. For example, the data collection module 200 may collect the user data that include a user's name, address, shopping preferences, favorite items, or stored payment instruments. The data collection module 200 may collect the user data that also include default settings established by the user, such as a default retailer/retailer location, payment instrument, delivery location, or delivery timeframe. The data collection module 200 may collect the user data from sensors on the user client device 100 or based on the user's interactions with the online concierge system 140.

The data collection module 200 also collects item data, which is information or data that identifies and describes items that are available at a retailer location. The data collection module 200 may collect the item data that include item identifiers for items that are available and may include quantities of items associated with each item identifier. Additionally, the data collection module 200 may collect the item data that also include attributes of items such as the size, color, weight, stock keeping unit (SKU), or serial number for the item. The data collection module 200 may collect the item data that further include purchasing rules associated with each item, if they exist. For example, age-restricted items such as alcohol and tobacco are flagged accordingly in the item data. The data collection module 200 may collect the item data that also include information that is useful for predicting the availability of items in retailer locations. For example, the data collection module 200 may collect the item data that include, for each item-retailer combination (a particular item at a particular warehouse), a time that the item was last found, a time that the item was last not found (a picker looked for the item but could not find it), the rate at which the item is found, or the popularity of the item. The data collection module 200 may collect the item data from the retailer computing system 120, the picker client device 110, or the user client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the data collection module 200 may collect the picker data for a picker that include the picker's name, the picker's location, how often the picker has serviced orders for the online concierge system 140, a user rating for the picker, which retailers the picker has collected items at, or the picker's previous shopping history. Additionally, the data collection module 200 may collect the picker data that include preferences expressed by the picker, such as their preferred retailers to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects the picker data from sensors of the picker client device 110 or from the picker's interactions with the online concierge system 140.

Additionally, the data collection module 200 collects order data, which is information or data that describes characteristics of an order. For example, the data collection module 200 may collect the order data that include item data for items that are included in the order, a delivery location for the order, a user associated with the order, a retailer location from which the user wants the ordered items collected, or a timeframe within which the user wants the order delivered. Also, the data collection module 200 may collect the order data that further include information describing how the order was serviced, such as which picker serviced the order, when the order was delivered, or a rating that the user gave the delivery of the order. In some embodiments, the data collection module 200 collects the order data that include user data for users associated with the order, such as user data for a user who placed the order or picker data for a picker who serviced the order.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from the user client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to assign an order to a picker based on a delivery timeframe requested by the user with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use the user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes a total cost for the order and charges the user that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In one or more embodiments, the machine-learning training module 230 may re-train the machine-learning model based on the actual performance of the model after the online concierge system 140 has deployed the model to provide service to users. For example, if the machine-learning model is used to predict a likelihood of an outcome of an event, the online concierge system 140 may log the prediction and an observation of the actual outcome of the event. Alternatively, if the machine-learning model is used to classify an object, the online concierge system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online concierge system 140 as a whole in its performance of the tasks described herein.

The data store 240 stores data used by the online concierge system 140. For example, the data store 240 stores user data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

The price sensitivity module 250 may determine a price sensitivity score for a user of the online concierge system 140. For example, a high value of the price sensitivity score (i.e., the price sensitivity score above a threshold score) may be indicative of the user who is price sensitive (e.g., overall, or for a specific type of item). And a low value of the price sensitivity score (i.e., the price sensitivity score less than or equal to the threshold score) may be indicative of the user who is price insensitive (e.g., overall, or for a specific type of item). The price sensitivity module 250 may access a price sensitivity model (e.g., machine-learning model) that is trained to predict a price sensitivity score for a given user of the online concierge system 140. The price sensitivity module 250 may deploy the price sensitivity model to run a machine-learning algorithm to predict, based on a set of inputs, the price sensitivity score for the given user. A set of parameters for the price sensitivity model may be stored at one or more non-transitory computer-readable media of the price sensitivity module 250. Alternatively, the set of parameters for the price sensitivity model may be stored at one or more non-transitory computer-readable media of the data store 240.

The price sensitivity module 250 may provide the set of inputs representing various input data to the price sensitivity model. In providing the set of inputs to the price sensitivity model, the price sensitivity module 250 may provide online user data with information about purchasing patterns for a given user of the online concierge system 140, and, in particular, data with information about the replacements the user chooses over a defined time period (e.g., week, month, six months, etc.) The online user data may be communicated from the user client device 100 via the network 130 to the online concierge system 140 and the price sensitivity module 250. In providing the set of inputs to the price sensitivity model, the price sensitivity module 250 may provide cart price data with information about an upper bound for a total monetary value of a user' cart. The price sensitivity module 250 may retrieve the cart price data from, e.g., a database at the data store 240.

Furthermore, in providing the set of inputs to the price sensitivity model, the price sensitivity module 250 may provide user's in-store behavior data that include information about in-store behavior for a given user of the online concierge system 140, such as placing items in and out of the smart shopping cart 150 and/or replacing items at checkout when using the smart shopping cart 150 (e.g., replacing more expensive items placed in the smart shopping cart 150 with less expensive items). The in-store behavior data may be gathered via cameras and other sensors of the smart shopping cart 150 and provided via the network 130 to the online concierge system 140 and the price sensitivity module 250.

Additionally or alternatively, in providing the set of inputs to the price sensitivity model, the price sensitivity module 250 may provide in-store list data that include information about usage of the in-store list functionality of a mobile application running on the user client device 100, such as information about replacements made using the in-store list functionality of a mobile application. The in-store list data may be communicated from the user client device 100 via the network 130 to the online concierge system 140 and the price sensitivity module 250.

Figure 3:
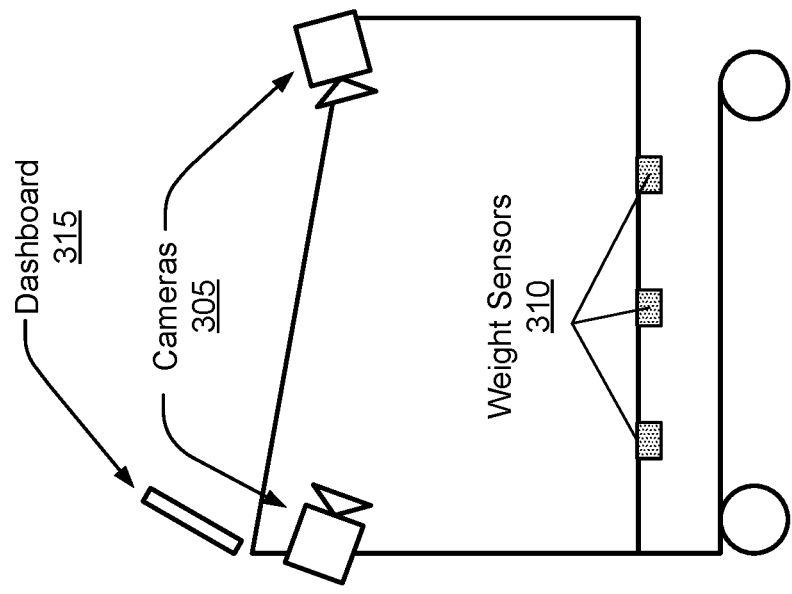
FIG. 3 illustrates an example smart shopping cart associated with an online concierge system, in accordance with one or more embodiments.

FIG. 3 illustrates an example smart shopping cart 150 associated with the online concierge system 140, in accordance with one or more embodiments. The smart shopping cart 150 may have one or more cameras 305 that collect video data and/or image data in relation to items placed in the smart shopping cart 150, such as a weight of each item as indicated in an item label, a brand of each item, a price of each item, etc. Alternatively or additionally, the one or more cameras 305 may collect video data and/or image data in relation to actions in and around the smart shopping cart 150, such as a location of the smart shopping cart 150 in the store when a certain action occurs (e.g., when an item is added to the cart), user's gestures when placing items in the smart shopping cart 150, video and/or images of user's interactions with the smart shopping cart 150, track the location of the user within the store, etc. Alternatively or additionally, the smart shopping cart 150 may be equipped with one or more weight sensors 310 that measure weights of items placed in the smart shopping cart 150. Hence, the cameras 305 and/or weight sensors 310 can gather in-store behavior data including information about one or more items that a user replaces at the smart shopping cart 150 while shopping at a location of a retailer associated with the online concierge system 140. The smart shopping cart 150 may further include a dashboard 315 that operates as a user interface that displays a list of items added to a receptacle of the smart shopping cart 150 and can be used for the checkout. The smart shopping cart 150 may include additional sensors not shown in FIG. 3. Data gathered by various sensors of the smart shopping cart 150 may be uploaded via the network 130 to the price sensitivity module 250.

A key facet in determining a price sensitivity score for a user of the online concierge system 140 at the price sensitivity model may be information about a replacement habit of the user. An example of two different brands of cotton candy ice cream can be considered—"Brand A cotton candy ice cream" with a cost of $7.99 for a pint and "Brand B cotton candy ice cream" with a cost of $12.99 for a pint. If the user substitutes the "Brand A cotton candy ice cream" with the "Brand B cotton candy ice cream" a certain number of times and the user does not complain or highly rates an order with this particular replacement, then the price sensitivity model may learn that the user is price insensitive and outputs a corresponding price sensitivity score for the user (e.g., price sensitivity score above a threshold score). However, in such cases, the price sensitivity model should not assume that the user is overall price insensitive, but only for a specific variety or type of items. More telltale signs for the overall price sensitivity feature would be if the price sensitivity occurred across multiple items of different types and an average price of a shopping cart they were purchasing. For example, if the average price of the shopping cart for the user was above an average price of shopping cart purchased at the online concierge system 140, this particular user can be considered to be price insensitive and this information can be further used as a data point for training the price sensitivity model (e.g., via the machine-learning training module 230).

In one or more embodiments, the price sensitivity module 250 retrieves information about certain brands purchased by a user of the online concierge system 140 from the data store 240 and provides the retrieved brand information as an input feature to the price sensitivity model. If the user is regularly purchasing certain "luxury" grocery store brands, the price sensitivity model can deduce that the user is less price-conscious and hence potentially more price insensitive. For example, a price-sensitive user likely would not be buying $10 jars of boutique tomato sauce. The information about certain brands (e.g., as retrieved from the data store 240) may further include information about retailer brands at which the user places online orders. For example, users that select mark-up retailers, niche organic retailers, or gourmet retailers are likely not price sensitive.

Furthermore, the price sensitivity module 250 may receive, via the network 130 from the user client device 100 and the picker client device 110, data with information about conversation between a user and a picker that is fulfilling an order placed by the user. The price sensitivity module 250 may then provide the conversation data to the price sensitivity model. The conversation data may include voice data and/or text data related to, e.g., the picker asking the user for approval of item replacements. For example, if the user specifically states, "I don't care the price I just want San Marzano tomatoes," the corresponding conversation data input to the price sensitivity model would represent a strong indication that the user is price insensitive at least for a specific type of item.

The price sensitivity module 250 may provide one or more other signals to the price sensitivity model. In providing the one or more other signals to the price sensitivity model, the price sensitivity module 250 may provide order data with information about order regularity in relation to the online concierge system. For example, the order data may include information about whether a user is shopping exclusively or almost-exclusively at the online concierge system 140, which can be considered to be a premium service. In providing the one or more other signals to the price sensitivity model, the price sensitivity module 250 may further provide user data with information about user's responsiveness to general discounts and promotions. For example, the user data may include information on how likely it is that a "$5 off your basket" coupon in a user's email would prompt the user's placement of an order at the online concierge system 140. In providing the one or more other signals to the price sensitivity model, the price sensitivity module 250 may also provide information about an average tip amount provided by a user to a picker who fulfills an order. For example, the average tip amount that is higher than a defined threshold amount may be indicative not only of a generous user but also of a user who is not price sensitive.

In one or more embodiments, the price sensitivity module 250 gathers purchase data for input into the price sensitivity model. The price sensitivity module 250 may generate purchase data by comparing past purchase data for a user (e.g., as available at the data store 240) with catalog data with information about item prices (e.g., as available at the data store 240 or provided from the retailer computing system 120 via the network 130). For example, the purchase data may include information on when an item increased in price, whether the user replaced that item with another item of similar price, or whether the user stopped buying that item all together. Additionally or alternatively, the price sensitivity module 250 may gather user preference data for input into the price sensitivity model. The user preference data may include information provided by the user about pre-selected replacement items for replacing items likely to be out of stock. The user preference data may be thus utilized as input features for the price sensitivity model even when no item replacement was actually executed by the user.

In one or more embodiments, the price sensitivity module 250 receives, via the network 130, signals from the smart shopping cart 150 for input into the price sensitivity model. The signals received from the smart shopping cart 150 may include information on what actions a user performed when shopping at a location of a retailer using the smart shopping cart 150. For example, the signals received from the smart shopping cart 150 may include information on whether the user scanned a first item, scanned a second item of a same type as the first item, and then removed the first item from the smart shopping cart 150, and the second item that remained in the smart shopping cart 150 is cheaper than the first item. This may be a strong indication that the user is price sensitive in relation to a specific item type.

In one or more other embodiments, the price sensitivity module 250 receives, via the network 130, signals from the user client device 100 generated by a user interacting with an in-store list of a mobile application running on the user client device 100. For example, the signals received from the in-store list feature of the user client device 100 may include information on what items the user added to the in-store list and what items the user removed from the in-store list. The price sensitivity module 250 may then correlate information about the added and/or removed in-store list items with information about item prices from a catalog of items (e.g., as available at the data store 240 or provided from one or more retailer computing systems 120 via the network 130). For example, if all items that were removed from the in-store list were gone up in price that week, a corresponding signal generated by the price sensitivity module 250 for input into the price sensitivity model may be a strong indication of a price sensitive user. Similarly, if all items that were removed from the in-store list were items that can be categorized more towards the "luxury" end of the spectrum of items, a corresponding signal generated by the price sensitivity module 250 for input into the price sensitivity model may be a strong indication of a price sensitive user.

In one or more embodiments, the price sensitivity module 250 provides user replacement data with information about a user interacting with product analogs (i.e., specific type of replacements). The online concierge system 140 may apply, using catalog data (e.g., as available at the data store 240), a replacement model (e.g., machine-learning model) trained to identify "product analogs", i.e., to identify pairs of items that are essentially alike, barring their size or quantity. The replacement model may be trained on a curated "golden" data set developed with the help of internal operation personnel. In a given pair of items that are product analogs, the smaller size or quantity is almost always priced higher, per unit or per ounce. Thus, when the online concierge system 140 offers a replacement of a product analog at a smaller size or quantity, the online concierge system 140 is essentially performing a very controlled experiment where the user is asked, "Are you willing to pay more for this item?" The user replacement data provided to the price sensitivity model may include information about how the user responds to the product analog over time. For example, if the user regularly accepts a "product analog" as the replacement, this may be a strong signal that the user is not price sensitive for a particular item category, brand and/or type. In contrast, if the user regularly accepts a cheaper per-unit/ounce item (e.g., generic brand product), or rejects the "product analog" replacement, this may be a strong signal that the user is more price sensitive for the particular item category, brand and/or type.

In one or more embodiments, the price sensitivity model utilizes various signals and/or heuristics for labeling whether a user is price sensitive. For example, the price sensitivity model may label a user of the online concierge system 140 as price insensitive based on a signal input into the price sensitivity model with information that the user selected an item that is labeled as being a luxury item. On the other hand, the price sensitivity model may label a user of the online concierge system 140 as price sensitive based on a signal input into the price sensitivity model with information that the user selected a bulky item to save money on the cost-per-quantity of the same item. Additionally or alternatively, the price sensitivity model may label a user of the online concierge system 140 as being a price sensitive or not based on user replacement data, in particular based on information about a cost difference between an originally ordered item and a replacement item.

Based on the set of inputs, the price sensitivity model may generate a price sensitivity score for a given user of the online concierge system 140. The price sensitivity module 250 may compare the price sensitivity score with a threshold score to determine whether to label the user as price sensitive or price sensitive. In such a case, the price sensitivity score generated by the price sensitivity model may represent a binary classifier. Alternatively, the price sensitivity model may generate a price sensitivity score for a given user that represents a continuous score, i.e., a user-specific elasticity metric indicative of a likelihood of purchase change by the user with a change in an item price. As enough data is collected over time, the online concierge system 140 may aggregate the knowledge about user's price sensitivity on the following three axes: (1) the user's overall price sensitivity across all types of items; (2) the price sensitivity of demand across all users of specific item categories (or brands, or specific items); and (3) the intersection of the first axis and the second axis providing information about the user's item-specific price sensitivity.

In one or more embodiments, the price sensitivity model may generate a user's price sensitivity score that is different for different categories of items. For example, different categories of items may be defined as different taxonomy nodes in a hierarchical item catalog (e.g., stored at the data store 240). Based on a set of item features, the price sensitivity model may generate a price sensitivity score that indicates whether a user of the online concierge system 140 is price sensitive for that specific item. For example, a user may be price insensitive on meat products but not on staples such as canned beans. The concept of taxonomy represents a retailer-agnostic way of categorizing items. For example, the canned beans for which the user is price sensitive can be identified as food→staples→beans within the taxonomy node. Note that a user's price sensitivity may vary along various item categories, as described above, or for specific brands they have loyalty to. Hence, the notion of brand should be also factored in alongside the taxonomy node. By comparing all of the above facets and then dividing them based on a section of the hierarchical item catalog, the price sensitivity model may determine which sections of the catalog a user is price insensitive or price sensitive on.

The item replacement module 260 may identify one or more candidate replacement items for suggesting to a user to replace an originally requested item that is unavailable (e.g., out of stock). The item replacement module 260 may identify one or more candidate replacement items based on a price sensitivity score for the user. For example, if the price sensitivity model identifies the user as price insensitive (e.g., price sensitivity score is below a threshold score), the item replacement module 260 may select a candidate replacement item for suggesting to the user that represents the "best" match to a requested missing item irrespective of a price of the candidate replacement item. And, if the price sensitivity model identifies the user as price sensitive (e.g., price sensitivity score meets or exceeds a threshold score), the item replacement module 260 may select a candidate replacement item for suggesting to the user that is not truly the same as a requested missing item, but a price of the candidate replacement item matches a price of the requested missing item.

The action application module 270 may trigger one or more actions based on a price sensitivity score for a given user as predicted by the price sensitivity model. For example, the action application module 270 may generate coupons or promotions to a collection of users that are identified as price sensitive users. Alternatively or additionally, the action application module 270 may generate upsell suggestions for a specific type of item to a collection of users that are identified as price insensitive users for that item type. Alternatively or additionally, the action application module 270 may generate recommendations for a retailer associated with the online concierge system 140 for dynamic pricing (e.g., discounting over a defined time period) based on a user's price sensitivity. In this manner, the online concierge system 140 helps a user find an appropriate item within a category based on the user's price sensitivity.

In one or more embodiments, the action application module 270 generates price sensitivity data for a collection of users that include information about price sensitivity scores for the collection of users (e.g., overall price sensitivity scores and/or price sensitivity scores for specific item types). The action application module 270 may then send, via the network 130, the price sensitivity data to retailer computing systems 120 associated with a group of retailers. The retailer may then utilize the price sensitivity data to make informed decisions and craft campaigns finely targeted towards their user base exhibiting high price insensitivity for certain items.

Additionally or alternatively, the retailers may utilize the price sensitivity data received from the online concierge system 140 as targeting conditions for discount campaigns. The retailers may target a discount on an item only to users who have shown high price insensitivity for this particular item category, brand, or item type. In this manner, the retailers can limit their offers only to the users where those offers are likely to drive more purchases. For example, based on the price sensitivity data, a retailer may choose not to attempt to upsell a small jar of a luxury brand of peanut butter to users who are price sensitive and instead attempt to upsell them on a larger jar of a less premium brand of peanut butter that represents better customer value. In this manner, the online concierge system 140 along with the retailer may identify the right item for the right category of users. For a brand-new item, based on the price sensitivity data, the retailers may choose to offer a discount only to users who show high price sensitivity in general, or high price sensitivity for this item category or brand.

In one or more embodiments, the online concierge system 140 allows consumer packaged goods (CPG) companies to purchase ads, some of which are accompanied by discounts or sale prices. The user price sensitivity data obtained from the online concierge system 140 facilitates understanding of which user group is more likely to be responsive to discounts or sales, thus allowing CPG companies to target their discount advertising to more price sensitive users, which increases their advertisement efficiency. Additionally or alternatively, the online concierge system 140 may sell targeted ads to more expensive brands and only show these luxury targeted ads to a collection of users who will actually convert. Thus, price sensitive user will still see results based on relevance, and not luxury targeted ads, which should boost user satisfaction on both ends (assuming price insensitive users may want to see and discover "luxury" brands compared to price insensitive users).

In one or more embodiments, the user price sensitivity data includes information about a total cart price sensitivity for each user in a collection of users. In particular, the user price sensitivity data includes information that a subset of users in the collection of users may always want to have a price tag of their entire shopping cart under a threshold monetary amount. The action application module 270 may use this information to trigger issuance of a discount coupon prior to a specific user reaching the threshold monetary amount for their shopping cart. Alternatively, a CPG company or a retailer associated with the online concierge system 140 may use the price sensitivity data with information about the user's total cart price sensitivity to trigger issuance of a discount coupon prior to the user reaching the threshold monetary amount for their shopping cart.

The machine-learning training module 230 may perform initial training of the price sensitivity model using training data. In general, the training data may include labels for each user in a collection of users in relation to whether that user is price sensitive or not (overall and/or with respect to a particular item). The machine-learning training module 230 may train the price sensitivity model using the generated training data with the price sensitivity labels to generate an initial set of parameters of the price sensitivity model.

In one or more embodiments, the machine-learning training module 230 generates the training data by collecting information about replacement pairs. Each replacement pair includes two items—an original item and a replacement item, and data from each of these items (e.g., price, weight, quantity, etc.) can be used (e.g., through a supervised mechanism run by the machine-learning training module 230) to assign a price sensitivity score to each replacement pair. The information about replacement pairs may be gathered from the user client device 100 and/or from the smart shopping cart 150. In one or more other embodiments, the machine-learning training module 230 generates the training data by tagging brands (e.g., luxury brands vs. no name brands), retailers (in-store prices vs. large markup) with price sensitivity scores and/or utilizing replacements metadata. For example, the replacements metadata may include information on whether a replacement was made to a higher cost item and a user filed a complaint, downvoted the replacement or asked for an appeasement.

In one or more other embodiments, the machine-learning training module 230 generates the training data based on user past purchase data. The user's past purchase data may include information on whether a user swapped items to a different variety if the price is much lower, as well as on information on what happens to the user's next cart when a certain item increases in price. The user's past purchase data may further include information on what percentage of items that a user buys are initially labeled as "luxury items." The user's past purchase data may further include information on the user's past responsiveness to general discounts and promotions, i.e., how likely is that a "X % off your basket" coupon in a user's email would prompt an order. The user's past purchase data may further include information on what percentage of sale items a user typically orders.

Furthermore, the machine-learning training module 230 may collect feedback data with information about a user's response in relation to a replacement item suggested to the user based on a user's price sensitivity score generated by the price sensitivity model. Additionally or alternatively, the feedback data may include information about responses from a collection of users in relation to one or more actions performed at the online concierge system 140 or performed by a retailer the online concierge system 140, such as providing targeted discounts to price sensitive users. The machine-learning training module 230 may re-train the price sensitivity model by updating the set of parameters of the price sensitivity model using the collected feedback data.

Figure 4:
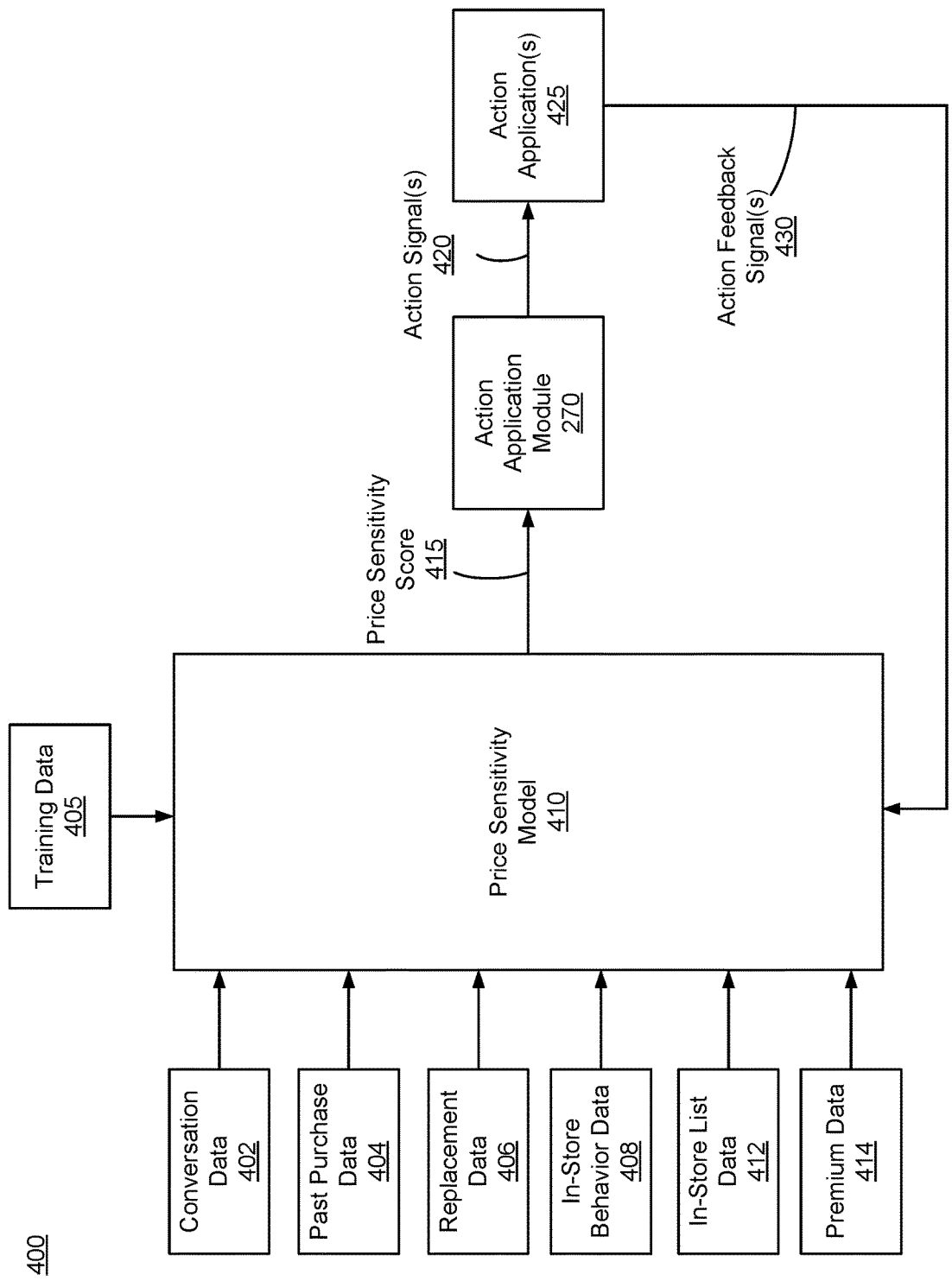
FIG. 4 illustrates an example architectural flow diagram of using a trained model to determine a price sensitivity feature for a user of an online concierge system, in accordance with one or more embodiments.

FIG. 4 illustrates an example architectural flow diagram 400 of using a trained model 410 to determine a price sensitivity feature for a user of the online concierge system 140, in accordance with one or more embodiments. First, the online concierge system 140 may perform (e.g., via the machine-learning training module 230) initial training of the price sensitivity model 410 using training data 405 to generate an initial set of parameters of the price sensitivity model 410. The training data 405 may be generated (e.g., via the machine-learning training module 230) by collecting information about replacement pairs, tagging brands and retailers with price sensitivity scores, retrieving past purchase data for a group of users, retrieving replacements metadata, etc. After the training process is completed, the online concierge system 140 may provide various inputs to the price sensitivity model 410 (e.g., via the price sensitivity module 250), such as conversation data 402, past purchase data 404, replacement data 406, in-store behavior data 408, in-store list data 412 and/or premium data 414. Some additional input features not shown in FIG. 4 suitable for evaluating a user's price sensitivity feature may be further provided to the price sensitivity model 410.

In providing the conversation data 402 to the price sensitivity model 410, the online concierge system 140 may provide (e.g., via the price sensitivity module 250) data with information about conversation between a user and a picker that is fulfilling an order placed by the user, including voice data and/or text data exchanged between the user and the picker in relation to replacement of one or more items during the order fulfillment process. The online concierge system 140 may receive the conversation data 402 from the user client device 100 and/or the picker client device 110 via the network 130. In providing the past purchase data 404 to the price sensitivity model 410, the online concierge system 140 may provide (e.g., via the price sensitivity module 250) data with information about purchasing patterns for the user, data with information about an average price of the user's shopping cart, purchasing behavior of the user when a price of an item is changed, etc. The price sensitivity module 250 may retrieve the past purchase data 404 from the data store 240.

In providing the replacement data 406 to the price sensitivity model 410, the online concierge system 140 may provide (e.g., via the price sensitivity module 250) data with information about replacements that the user selected for online orders over a defined time period (e.g., week, month, two months, etc.), data information about the user interacting with product analogs, data with information about a cost difference between originally ordered items and replaced items, etc. The online concierge system 140 may receive replacement data 406 from the user client device 100 via the network 130. In providing the in-store behavior data 408 to the price sensitivity model 410, the online concierge system 140 may provide (e.g., via the price sensitivity module 250) data with information about the user placing items in and out of the smart shopping cart 150 and/or replacing items at checkout when using the smart shopping cart 150. The in-store behavior data 408 may be gathered via cameras and other sensors of the smart shopping cart 150 and provided via the network 130 to the online concierge system 140 and the price sensitivity module 250.

In providing the in-store list data 412 to the price sensitivity model 410, the online concierge system 140 may provide (e.g., via the price sensitivity module 250) data with information about replacements made using the in-store list functionality of a mobile application running on the user client device 100 and/or transaction log (TLOG) data capturing the transactional purchasing history for the user. The in-store list data 412 may be communicated from the user client device 100 via the network 130 to the online concierge system 140 and the price sensitivity module 250. In providing the premium data 414 to the price sensitivity model 410, the online concierge system 140 may provide (e.g., via the price sensitivity module 250) data with information about "luxury" brands purchased by the user over a defined time period (e.g., week, month, two months, etc.), information about the user purchasing online at "premium" retailers over the defined time period, information about a frequency of the user purchasing online, etc. The price sensitivity module 250 may retrieve the premium data 414 from the data store 240 and/or receive portions of the premium data 414 from the user client device 100 via the network 130.

The price sensitivity model 410 may apply a machine-learning algorithm to the conversation data 402, the past purchase data 404, the replacement data 406, the in-store behavior data 408, the in-store list data 412, and/or the premium data 414 to output price sensitivity score 415 for the user indicative of a price sensitivity feature of the user. The sensitivity score 415 may be an overall price sensitivity score or a price sensitivity score for a specific item type. Alternatively, the price sensitivity score 415 may represent a price elasticity metric for the user indicative of a likelihood of conversion change by the user with a change in a price of an item. The price sensitivity score 415 output by the price sensitivity model 410 may be passed to the action application module 270.

The action application module 270 may generate, based on the price sensitivity score 415, one or more action signals 420 that trigger one or more actions, such as generating replacement recommendations for the user, generating a coupon (e.g., discount or promotion) for the user who is identified as price sensitive, generating upsell suggestions for specific types of items if the user is identified as price insensitive for the specific types of items, generating one or more recommendations for a retailer for dynamic pricing (e.g., discounting over a defined time period), some other action, or some combination thereof. The one or more actions triggered by the one or more action signals 420 may be cumulatively performed as action application(s) 425.

The action application(s) 425 may generate one or more action feedback signals 430 indicative of results of the applied actions. For example, the one or more action feedback signals 430 may include information about a user's response in relation to a replacement item suggested to the user based on the price sensitivity score 415, information about conversion by the user when a discount is offered to the user, information about a user's response to the upsell suggestions, information about how a targeted group of users responded to discount offers, etc. The online concierge system 140 may utilize (e.g., via the machine-learning training module 230) the one or more action feedback signals 430 to re-train the price sensitivity model 410. By utilizing the one or more action feedback signals 430, the machine-learning training module 230 may continuously improve the set of parameters of the price sensitivity model 410 to provide an accurate price sensitivity score 415 for a given user of the online concierge system 140.

Figure 5:
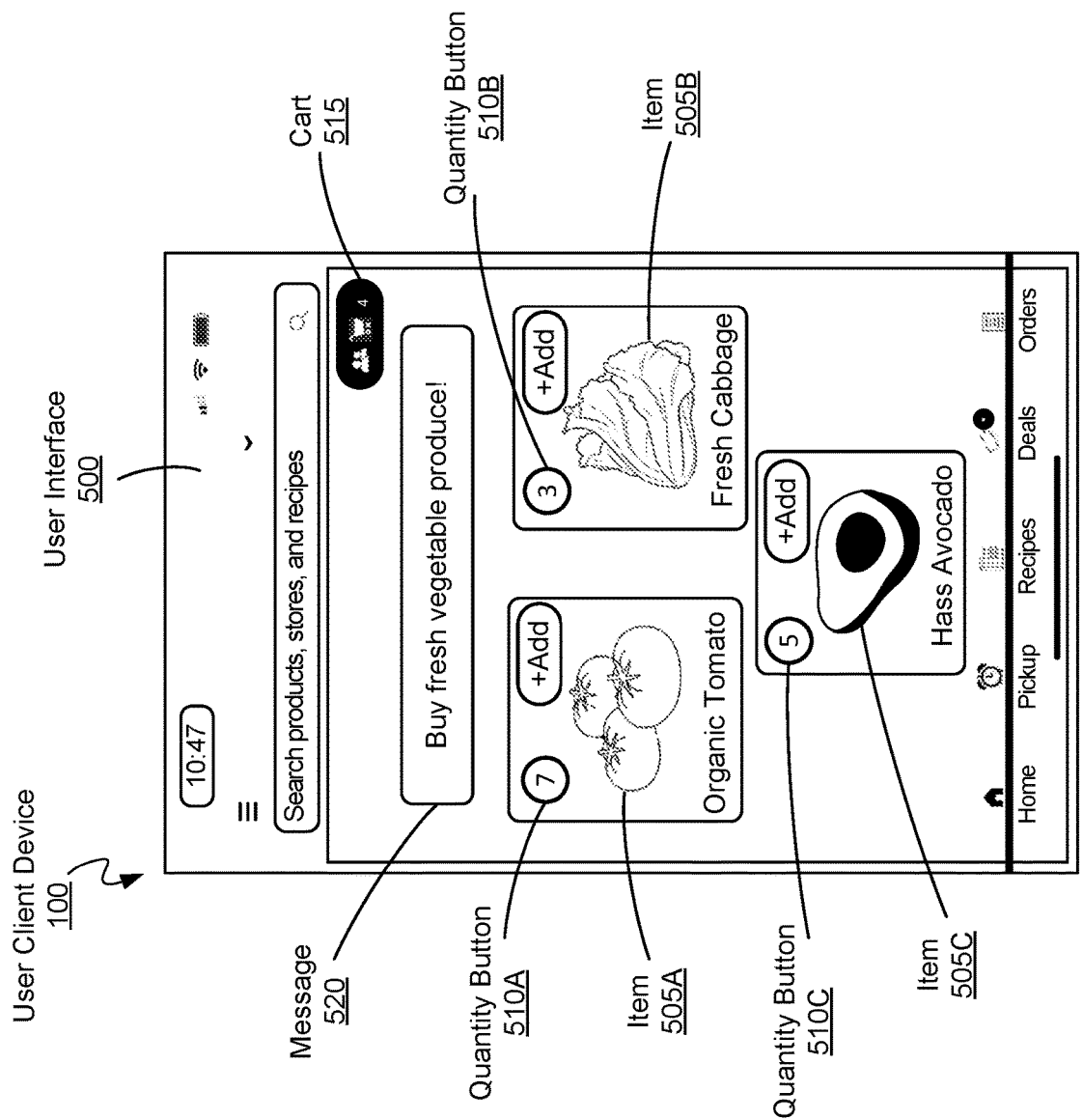
FIG. 5 illustrates an example user interface of a device associated with a user of an online concierge system that displays recommended items for the user based on a price sensitivity feature of the user predicted by a trained model, in accordance with one or more embodiments.

FIG. 5 illustrates an example user interface 500 of the user client device 100 that displays recommended items for a user of the online concierge system 140 based on a price sensitivity feature of the user predicted by the price sensitivity model, in accordance with one or more embodiments. Upon triggering an action (e.g., via the action application module 270) in response to a price sensitivity score output by the price sensitivity model, the content presentation module 210 causes the user client device 100 to display the user interface 500 during an ordering session of the user (e.g., before the checkout or at the checkout). As the price sensitivity model outputs a corresponding price sensitivity score that identifies the user as price insensitive for "fresh vegetables" item type, the action application module 270 triggers upselling suggestions for the user in relation to the "fresh vegetables" item type. Hence, the content presentation module 210 causes the user interface 500 to display a vegetable item 505A (e.g., "Organic Tomato") with a suggested quantity as indicated by a quantity button 510A, a vegetable item 505B (e.g., "Fresh Cabbage") with a suggested quantity as indicated by a quantity button 510B, and a vegetable item 505C (e.g., "Hass Avocado") with a suggested quantity as indicated by a quantity button 510C. The user may utilize the user interface 500 to add any of the items 505A, 505B, 505C having the suggested quantities into the cart 510. The user may also use any of the quantity buttons 510A, 510B, 510C to make changes to any of the suggested quantities. Although FIG. 5 shows the user interface 500 with three suggested items, the user interface 500 may display fewer or additional items which are not necessarily produce items. The content presentation module 210 may also cause the user client device 100 to further display the user interface 500 with a message 520 prompting the user to purchase suggested produce items 505A, 505B, 505C. Alternatively, the user may ignore the upsell suggestions and proceed to the checkout without updating the cart 515. A signal generated based on the user's response to the upsell suggestions may be then utilized (e.g., via the machine-learning training module 230) to re-train the price sensitivity model.

Figure 6:
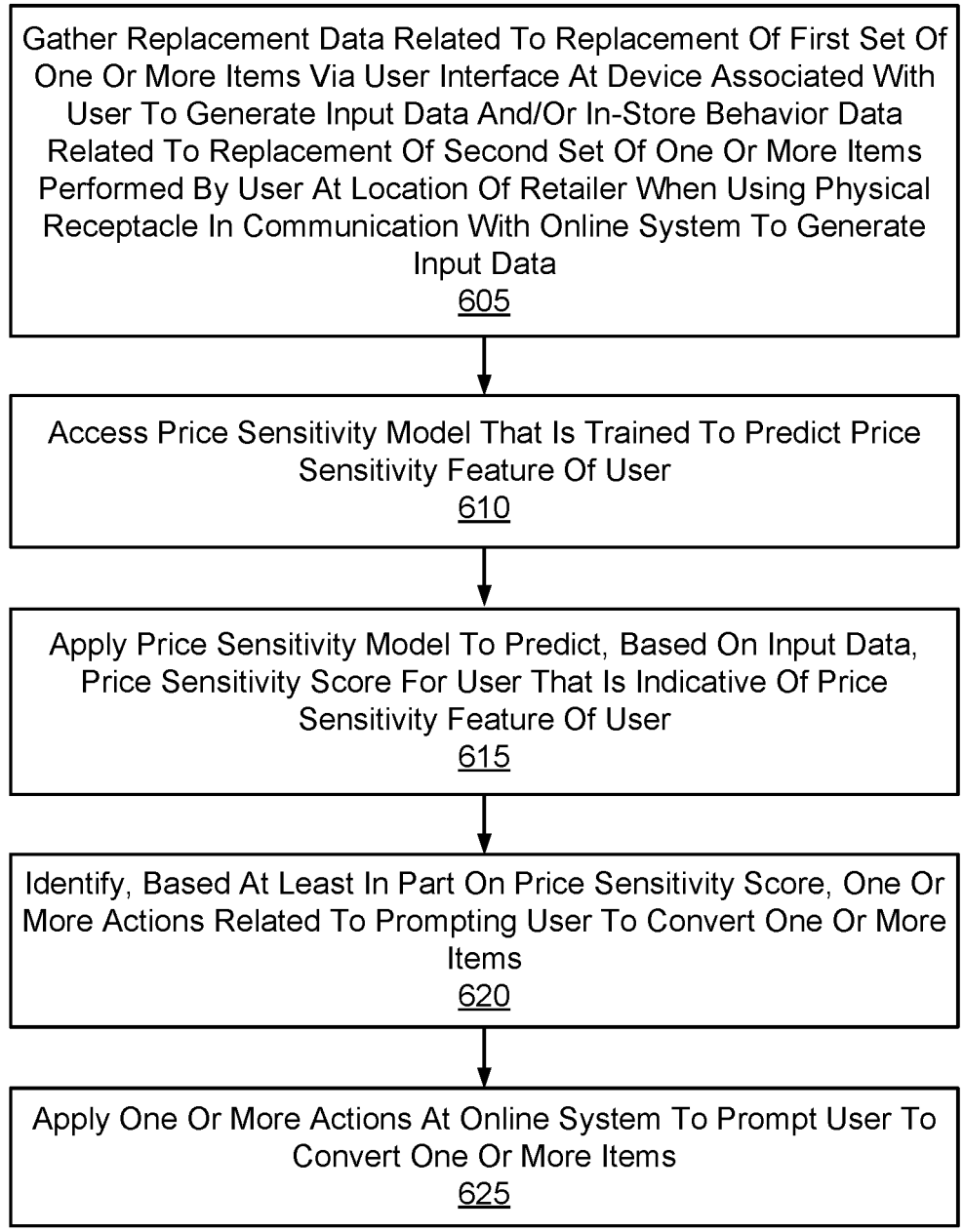
FIG. 6 is a flowchart for a method of using a trained model to determine a price sensitivity feature for a user of an online concierge system, in accordance with one or more embodiments.

FIG. 6 is a flowchart for a method of using a trained model to determine a price sensitivity feature for a user of an online concierge system, in accordance with one or more embodiments. Alternative embodiments may include more, fewer, or different steps from those illustrated in FIG. 6, and the steps may be performed in a different order from that illustrated in FIG. 6. These steps may be performed by an online concierge system (e.g., the online concierge system 140). Additionally, each of these steps may be performed automatically by the online concierge system without human intervention.

The online concierge system 140 gathers 605 (e.g., via the price sensitivity module 250) at least one of replacement data related to a replacement of a first set of one or more items via a user interface at a device associated with a user (e.g., the user client device 100) to generate input data or in-store behavior data related to a replacement of a second set of one or more items performed by the user at a location of a retailer associated with the online concierge system 140 when using a physical receptacle in communication with the online concierge system 140 to generate the input data. In one or more embodiments, the physical receptacle is the smart shopping cart 150. One or more sensors associated with the physical receptacle may capture the in-store behavior data, i.e., data about the user's actions at the location of the retailer while the user uses the physical receptacle for shopping at the location of the retailer. The one or more sensors may be one or more cameras 305 (e.g., mounted on the smart shopping cart 150), an application/device in communication with the physical receptacle that scans items that the user places in the physical receptacle, the one or more weight sensors 310, some other sensors, or some combination thereof.

In one or more embodiments, the online concierge system 140 gathers the replacement data to generate the input data by receiving (e.g., at the price sensitivity module 250), from the device associated with the user via a network (e.g., the network 130), the replacement data including features of the first set of one or more items and features of a set of one or more replacement items that the user selected for the replacement of the first set of one or more items. Alternatively or additionally, the online concierge system 140 may gather the in-store behavior data to generate the input data by gathering the in-store behavior data using one or more sensors mounted on the physical receptacle (e.g., the one or more cameras 305 and/or the one or more weight sensors 310 of the smart shopping cart 150) when the user is at the location of the retailer and replaces the second set of one or more items with a set of one or more replacement items. The in-store behavior data may include features of the second set of one or more items and features of the set of one or more replacement items.

The online concierge system 140 may generate the input data by receiving (e.g., at the price sensitivity module 250), via the network and from at least one of the device associated with the user or a device of a picker (e.g., the picker client device 110) who fulfills an order placed by the user, data communicated between the device associated with the user and the device of the picker. The online concierge system 140 may retrieve (e.g., via the price sensitivity module 250), from a database (e.g., at the data store 240), past purchase data associated with the user. The online concierge system 140 may then compare (e.g., via the price sensitivity module 250) the past purchase data with information about prices from a catalog of items (e.g., at the data store 240) to generate the input data.

The online concierge system 140 accesses 610 a price sensitivity model of the online concierge system 140 (e.g., via the price sensitivity module 250), wherein the price sensitivity model is trained to predict a price sensitivity feature of the user. The online concierge system 140 applies 615 the price sensitivity model (e.g., via the price sensitivity module 250) to predict, based on the input data, a price sensitivity score for the user that is indicative of the price sensitivity feature of the user.

The online concierge system 140 may apply the price sensitivity model (e.g., via the price sensitivity module 250) to predict the price sensitivity score for a specific type of item that is indicative of the price sensitivity feature of the user for the specific type of item. Alternatively or additionally, the online concierge system 140 may apply the price sensitivity model (e.g., via the price sensitivity module 250) to further predict, based on the input data, a price elasticity metric for the user that is indicative of a likelihood of conversion change by the user with a change in a price of an item.

The online concierge system 140 identifies 620 (e.g., via the action application module 270), based at least in part on the price sensitivity score, one or more actions related to prompting the user to convert one or more items. The online concierge system 140 applies 625 (e.g., via the action application module 270) the one or more actions at the online system to prompt the user to convert the one or more items. The online concierge system 140 may identify (e.g., via the action application module 270), based on the price sensitivity score for the specific type of item, the one or more actions related to prompting the user to convert the one or more items of the specific type. The online concierge system 140 may identify (e.g., via the action application module 270), based on the price elasticity metric, a recommendation about changing the price of the item. The online concierge system 140 may apply the one or more actions by sending (e.g., via the action application module 270), via the network, the recommendation to a computing system associated with the retailer (e.g., the retailer computing system 120) about changing the price of the item.

The online concierge system 140 may apply the one or more actions by causing (e.g., via the content presentation module 210) the device associated with the user to display a user interface with the one or more items prompting the user to convert the one or more items. The online concierge system 140 may trigger (e.g., via the action application module 270), based in part on the price sensitivity score, issuance of one or more discount coupons for conversion of the one or more items. The online concierge system 140 may then cause (e.g., via the content presentation module 210) the device associated with the user to display a user interface with the one or more discount coupons prompting the user to convert the one or more items using the one or more discount coupons.

The online concierge system 140 may generate (e.g., via the machine-learning training module 230) training data by collecting information about a plurality of replacement pairs for a group of users of the online system over a defined time period, wherein each user in the group replaced a first item of a replacement pair of the plurality of replacement pairs with a second item of the replacement pair. Alternatively or additionally, the online concierge system 140 may generate (e.g., via the machine-learning training module 230) training data by gathering past purchase data for a group of users of the online concierge system 140. The online concierge system 140 may train (e.g., via the machine-learning training module 230) the price sensitivity model using the training data to generate an initial set of parameters of the price sensitivity model. The online concierge system 140 may collect (e.g., via the machine-learning training module 230) feedback data with information about a response by the user in relation to the one or more items suggested to the user based on the price sensitivity score. The online concierge system 140 may re-train (e.g., via the machine-learning training module 230) the price sensitivity model by updating, using the collected feedback data, the set of parameters of the price sensitivity model.

Embodiments of the present disclosure are directed to the online concierge system 140 that uses a trained model that predicts a price sensitivity score for a given user of the online concierge system 140. The online concierge system 140 presented herein leverages special and nonconventional technical means to obtain input features for the trained model, i.e., through "omnichannel" interactions where user actions are observed across the smart shopping cart 150 (e.g., interactions with items captured by cameras or other sensors on the smart shopping cart 150), usage of a mobile app running on the user client device 100, etc.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:
    gathering, via sensors mounted on a physical cart in communication with an online system, sensor data including information about replacing, in the physical cart by a user of the online system that operates the physical cart during a conversion session of the user at a location of a retailer, a set of one or more items with a set of one or more replacement items;
    receiving, via a network, the sensor data communicated from the physical cart;
    receiving, via the network and from at least one of a device associated with the user or a device associated with a picker who fulfills an order placed by the user, conversation data with information about conversation between the user and the picker, the conversation data including at least one of voice data or text data exchanged between the device associated with the user and the device associated with the picker;
    accessing a price sensitivity machine-learning model of the online system, wherein the price sensitivity machine-learning model is trained to predict a price sensitivity feature of the user;
    applying the price sensitivity machine-learning model to the sensor data and the conversation data to generate a price sensitivity score for the user that is indicative of the price sensitivity feature of the user;
    generating, based at least in part on the price sensitivity score, one or more action signals related to prompting the user to convert one or more items; and
    causing, using the one or more action signals, the device associated with the user to display a user interface with a message prompting the user, during the conversion session at the location of the retailer, to convert the one or more items.

2. The method of claim 1, wherein receiving the sensor data comprises:
    receiving, from the physical cart and via the network, data including features of the set of one or more items and features of the set of one or more replacement items that the user selected for replacing the set of one or more items.

3. The method of claim 1, further comprising:
    retrieving, from a database of the online system, past purchase data associated with the user; and
    comparing the past purchase data with information about prices from a catalog of items to generate input data, wherein applying the price sensitivity machine-learning model comprises applying the price sensitivity machine-learning model further to the input data to generate the price sensitivity score.

4. The method of claim 1, wherein:
    applying the price sensitivity machine-learning model comprises applying the price sensitivity machine-learning model to generate the price sensitivity score for a specific type of item that is indicative of the price sensitivity feature of the user for the specific type of item; and
    generating the one or more action signals comprises generating, based on the price sensitivity score for the specific type of item, the one or more action signals related to prompting the user to convert the one or more items of the specific type.

5. The method of claim 1, wherein:
    applying the price sensitivity machine-learning model comprises applying the price sensitivity machine-learning model to the sensor data and the conversation data to generate a price elasticity metric for the user that is indicative of a likelihood of conversion change by the user with a change in a price of an item;

generating the one or more action signals comprises generating, based on the price elasticity metric, a recommendation about changing the price of the item; and sending, via the network, the recommendation to a computing system associated with the retailer about changing the price of the item.

6. The method of claim 1, further comprising:

triggering, based in part on the price sensitivity score, issuance of one or more discount coupons for conversion of the one or more items; and causing the device associated with the user to display the user interface further with the one or more discount coupons prompting the user to convert the one or more items using the one or more discount coupons.

7. The method of claim 1, further comprising:

generating training data by collecting information about a plurality of replacement pairs for a group of users of the online system over a defined time period, wherein each user in the group replaced a first item of a replacement pair of the plurality of replacement pairs with a second item of the replacement pair; and training the price sensitivity machine-learning model using the training data to generate an initial set of parameters of the price sensitivity machine-learning model.

8. The method of claim 1, further comprising:

generating training data by gathering past purchase data for a group of users of the online system; and training the price sensitivity machine-learning model using the training data to generate an initial set of parameters of the price sensitivity machine-learning model.

9. The method of claim 1, further comprising:

collecting feedback data with information about a response by the user in relation to the one or more items the user was prompted to convert; and re-training the price sensitivity machine-learning model by updating, using the collected feedback data, a set of parameters of the price sensitivity machine-learning model.

10. A computer program product comprising a non-transitory computer readable storage medium having instructions encoded thereon that, when executed by a processor, cause the processor to perform steps comprising:

gathering, via sensors mounted on a physical cart in communication with an online system, sensor data including information about replacing, in the physical cart by a user of the online system that operates the physical cart during a conversion session of the user at a location of a retailer, a set of one or more items with a set of one or more replacement items;

receiving, via a network, the sensor data communicated from the physical cart;

receiving, via the network and from at least one of a device associated with the user or a device associated with a picker who fulfills an order placed by the user, conversation data with information about conversation between the user and the picker, the conversation data including at least one of voice data or text data exchanged between the device associated with the user and the device associated with the picker;

accessing a price sensitivity machine-learning model of the online system, wherein the price sensitivity machine-learning model is trained to predict a price sensitivity feature of the user;

applying the price sensitivity machine-learning model to the sensor data and the conversation data to generate a price sensitivity score for the user that is indicative of the price sensitivity feature of the user;

generating, based at least in part on the price sensitivity score, one or more action signals related to prompting the user to convert one or more items; and causing, using the one or more action signals, the device associated with the user to display a user interface with a message prompting the user, during the conversion session at the location of the retailer, to convert the one or more items.

11. The computer program product of claim 10, wherein the instructions further cause the processor to perform steps comprising:

receiving the sensor data by receiving, from the physical cart and via the network, data including features of the set of one or more items and features of the set of one or more replacement items that the user selected for replacing the set of one or more items.

12. The computer program product of claim 10, wherein the instructions further cause the processor to perform steps comprising:

applying the price sensitivity machine-learning model to generate the price sensitivity score for a specific type of item that is indicative of the price sensitivity feature of the user for the specific type of item; and generating, based on the price sensitivity score for the specific type of item, the one or more action signals related to prompting the user to convert the one or more items of the specific type.

13. The computer program product of claim 10, wherein the instructions further cause the processor to perform steps comprising:

applying the price sensitivity machine-learning model to the sensor data and the conversation data to generate a price elasticity metric for the user that is indicative of a likelihood of conversion change by the user with a change in a price of an item;

generating, based on the price elasticity metric, a recommendation about changing the price of the item; and sending, via the network, the recommendation to a computing system associated with the retailer about changing the price of the item.

14. The computer program product of claim 10, wherein the instructions further cause the processor to perform steps comprising:

generating training data by collecting information about a plurality of replacement pairs for a group of users of the online system over a defined time period, wherein each user in the group replaced a first item of a replacement pair of the plurality of replacement pairs with a second item of the replacement pair;

training the price sensitivity machine-learning model using the training data to generate a set of parameters of the price sensitivity machine-learning model;

collecting feedback data with information about a response by the user in relation to the one or more items the user was prompted to convert; and re-training the price sensitivity machine-learning model by updating, using the collected feedback data, the set of parameters of the price sensitivity machine-learning model.

15. A computer system comprising:

a processor; and a non-transitory computer-readable storage medium having instructions that, when executed by the processor, cause the computer system to perform steps comprising:

gathering, via sensors mounted on a physical cart in communication with an online system, sensor data including information about replacing, in the physical cart by a user of the online system that operates the physical cart during a conversion session of the user at a location of a retailer, a set of one or more items with a set of one or more replacement items;

receiving, via a network, the sensor data communicated from the physical cart;

receiving, via the network and from at least one of a device associated with the user or a device associated with a picker who fulfills an order placed by the user, conversation data with information about conversation between the user and the picker, the conversation data including at least one of voice data or text data exchanged between the device associated with the user and the device associated with the picker;

accessing a price sensitivity machine-learning model of the online system, wherein the price sensitivity machine-learning model is trained to predict a price sensitivity feature of the user;

applying the price sensitivity machine-learning model to the sensor data and the conversation data to generate a price sensitivity score for the user that is indicative of the price sensitivity feature of the user;

generating, based at least in part on the price sensitivity score, one or more action signals related to prompting the user to convert one or more items; and causing, using the one or more action signals, the device associated with the user to display a user interface with a message prompting the user, during the conversion session at the location of the retailer, to convert the one or more items.

* * * * *